April 14, 1925.
C. J. HUG
1,533,419
COMPARTMENT DUMPING VEHICLE
Filed Feb. 21, 1924
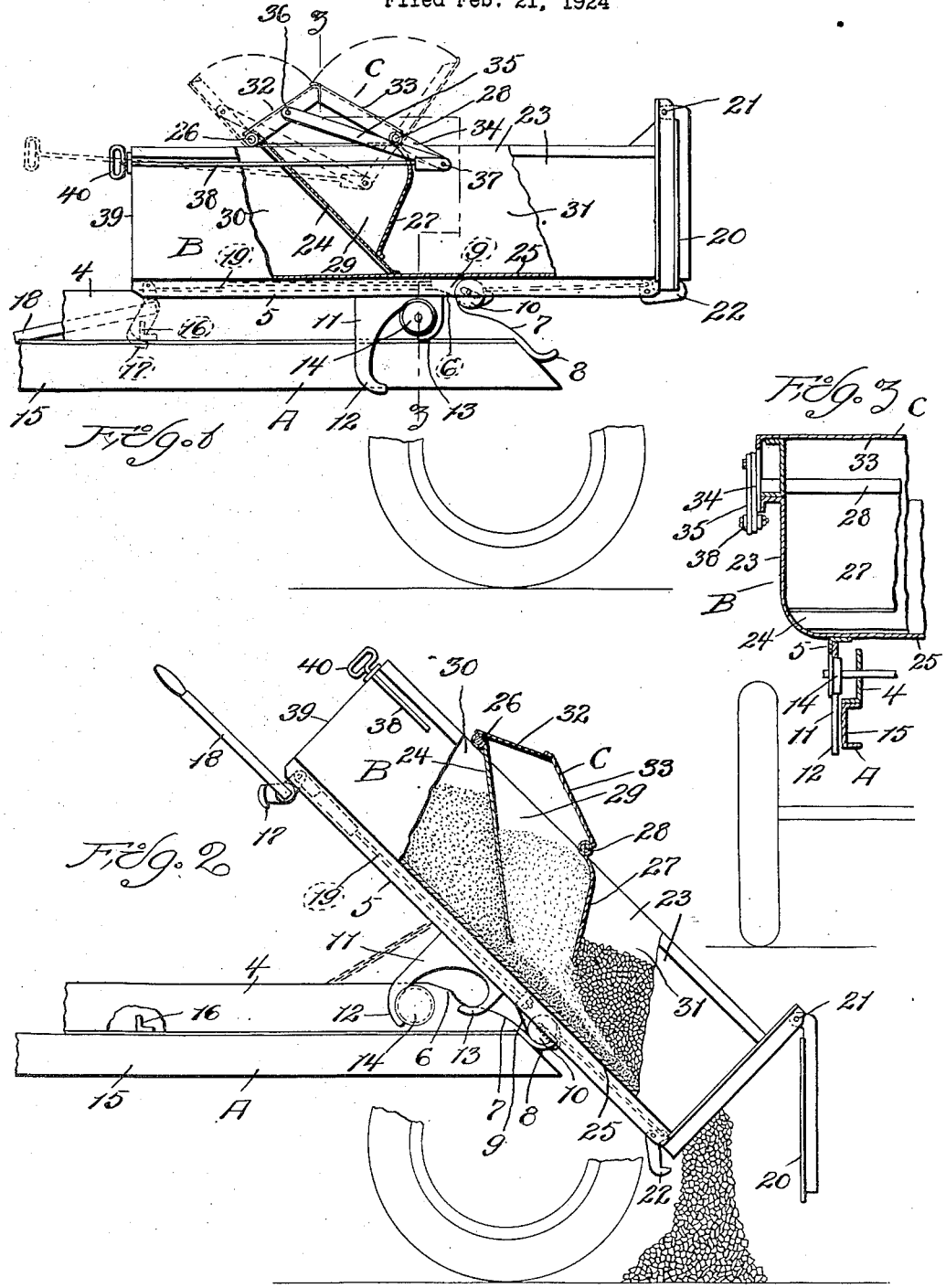
INVENTOR
CHRISTIAN J. HUG,
by James L. Hopkins, ATTORNEY.

Patented Apr. 14, 1925.

1,533,419

UNITED STATES PATENT OFFICE.

CHRISTIAN J. HUG, OF HIGHLAND, ILLINOIS, ASSIGNOR TO THE HUG COMPANY, OF HIGHLAND, ILLINOIS, A CORPORATION OF ILLINOIS.

COMPARTMENT-DUMPING VEHICLE.

Application filed February 21, 1924. Serial No. 694,216.

*To all whom it may concern:*

Be it known that I, CHRISTIAN J. HUG, a citizen of the United States of America, residing at Highland, in the county of Madison and State of Illinois, have invented certain new and useful Improvements in Compartment-Dumping Vehicles, of which the following is a specification, reference being had therein to the accompanying drawing.

My invention relates to an improvement in compartment dumping vehicles, and has for its object to provide a vehicle for the transportation of two or more substances in lump or granular form, said substances being kept separated in compartments formed by means of hinged plates, said plates being preferably so disposed as to cause the preliminary mixing of the various portions of the load during the operation of dumping.

The vehicle of my invention also has provision for rigidly holding the vehicle body locked when in loaded position, and for permitting sliding and rearwardly tilting movement of said body for the purpose of dumping, with provision for accommodating the rearward movement of the body with reference to the chassis, and abruptly stopping such rearward movement to jolt the contents free from the body.

My invention also contemplates a central compartment for the reception and carriage of cement, that compartment being formed by a forward hinged plate whose lower edge rests upon the bottom of the vehicle, and a rear hinged plate whose lower edge rests upon the rear face of said forward plate at a point above the plane of the bottom of the vehicle, so that said compartment may receive, hold and discharge its load of cement without permitting that cement to come in contact with the bottom of the vehicle; the cement being kept from such contact during the discharging operation by the rearward flow of material from the front compartment. The object of this central compartment construction being to prevent the cement from adhering and caking upon the vehicle floor when that floor is damp.

Drawings.

In the drawing—

Fig. 1 is a side elevation of a vehicle embodying my invention, the body being in loaded position.

Fig. 2 is a similar view of the vehicle, the body being in dumping position.

Fig. 3 is a transverse sectional view taken on the line 3—3 of Fig. 1.

Description.

As shown in the drawings, the chassis A has longitudinal sills 4 whereon side sills 5 of the body B rest when in loaded position. The rear ends of the sills 4 are contoured as shown in the drawings, having a beveled shoulder 6, and compound-grooved incline 7 and a terminal hook 8.

The body sills 5 carry the wedge-shaped member 9 which rests upon the beveled shoulder 6 when the body B is in loaded position. The sills 5 also carrying the roller 10 which is held, when the body B is in loaded position, at the point shown in Fig. 1, said roller 10 moving rearwardly during the operation of dumping, until it rests upon the hooks 8, administers a jar or jolt to the body B to aid in the discharge of the contents. Forward of the wedge-shaped member 9, and depending from the bottoms of the sills 5 I have provided the guide members 11 each of which has the downwardly depending claw 12 at its lower terminal and the forwardly projecting claw 13 at its rear terminal, said claws 12 and 13 being adapted to engage with the cylindrical stop 14, the claw 13 engaging therewith when the body B is in loaded position as in Fig. 1, and the claw 12 engaging therewith when the body B is in dumping position as in Fig. 2.

The chassis sills 4 rest upon base sills 15, which base sills 15 carry the transverse bar 16 with which the hook 17 engages to lock the body B in loaded position, the hook 17 being locked and unlocked by means of the hand lever 18.

The depression of the hand lever 18 to locking position (see Fig. 1) draws the wedge-member 9 into position upon its seat 6 by means of the rod 19.

The body B is provided with an end gate 20 hinged as shown at 21, and held in closed position when the body B is loaded, by a latch 22. I have indicated the side walls of the body B as 23 and transversely between said side walls 23 I provide a forward hinged plate 24 whose lower edge normally rests in contact with the floor 25 of said body B. To the rear of said plate 24, which is hinged at 26, I provide a second hinged plate 27 hinged at 28, the lower edge of the plate 27 normally resting, as shown, upon the rear face of the plate 24 at a point somewhat above, but near, the floor 25. These plates 24 and 27 normally form the central compartment 29 and provide the body B with the forward compartment 30 and rear compartment 31. A cover C for the central compartment 29 is provided by means of the hinged cover plates 32 and 33, which, when in opened position as shown in Fig. 1 form a funnel for the mouth of the compartment 29. Said cover plates 32 and 33 are hinged at 26 and 28 respectively and are connected by the mechanism illustrated in Fig. 1; the cover plate 33 has a rearwardly extending lever arm 34, the plate 32 has a lever arm 35 hinged to it at 36, and the rear ends of the arms 34 and 35 are pivotally connected at 37 with the rod 38 which extends through the front wall 39 of the body B and terminates in the handle 40.

*Mode of operation.*

While the compartment-body thus described is capable of use with any desired class of material, an illustrative use is shown in Fig. 2 in which the content of the rear compartment 31 is crushed rock, the content of the central compartment 29 is Portland cement and the content of the front compartment 30 is sand.

The body B having been tilted to dumping position, the end gate 20 being opened, crushed rock is delivered from the compartment 31, releasing the hinged plate 27, permitting Portland cement to begin to flow from the central compartment 29. As the pressure holding the plate 24 in contact with the floor 25 is released, sand from the forward compartment 30 will commence to flow beneath said plate 24, this operation causing a preliminary mixture of these three ingredients of concrete as illustrated in Fig. 2.

As further shown in Fig. 2, the mounting and formation of the forward hinged plate 24 are such that the sand or like material flowing rearwardly from the compartment 30 will in its discharging movement intervene between the cement flowing from the central compartment 29 and the floor of the body B keeping the cement from contact with said floor. Whatever moisture may be present in the contents of the compartment 30 tends to dampen the floor of the body B, and my construction as illustrated in Fig. 2 keeps the discharging cement out of contact with the floor and prevents the caking of cement upon said floor, which caking requires scraping to remove it.

*Claims.*

I claim—

1. In a compartment dumping vehicle a body having a central compartment formed by two hinged plates, the bottom of said central compartment being above the plane of the bottom of said body, and end compartments formed by said plates when in loaded position.

2. In a compartment dumping vehicle a body having a central compartment formed by two hinged plates, and end compartments formed by said plates when in loaded position, said central compartment having a cover formed of two hinged cover plates arranged to form a funnel for said central compartment when in opened position.

3. In a compartment dumping vehicle a body having a central compartment formed by two hinged plates, and end compartments formed by said plates when in loaded position, said central compartment having a cover formed of two hinged cover plates arranged to form a funnel for said central compartment when in opened position and to form deflectors for the mouths of the end compartments when in closed position.

4. A compartment dumping vehicle comprising a body having a central compartment formed by two hinged plates; the bottom of said central compartment being above the plane of the bottom of said body; a chassis carrying said body; and means for guiding said body to dumping position and there jolting said body to aid in releasing said plates and discharging the contents of said body.

5. A compartment dumping vehicle comprising a body having a central compartment formed by two hinged plates; a chassis carrying said body; and means comprising a pair of terminal hooks at the rear of said chassis and a roller mounted beneath said body, for guiding said body to dumping position and there jolting said body to aid in releasing said plates and discharging the contents of said body.

6. A dumping vehicle comprising a body having two hinged plates arranged to form a central compartment in said body the bottom of which central compartment is above the plane of the bottom of said vehicle body.

7. A dumping vehicle comprising a body having two hinged plates of which the forward plate extends rearwardly and in loading position contacts with the bottom of said body and the rear plate extends forwardly with its bottom edge resting upon the rear face of the forward plate to form a central compartment when in loading position.

In testimony whereof I have hereunto affixed my signature.

CHRISTIAN J. HUG.